UNITED STATES PATENT OFFICE.

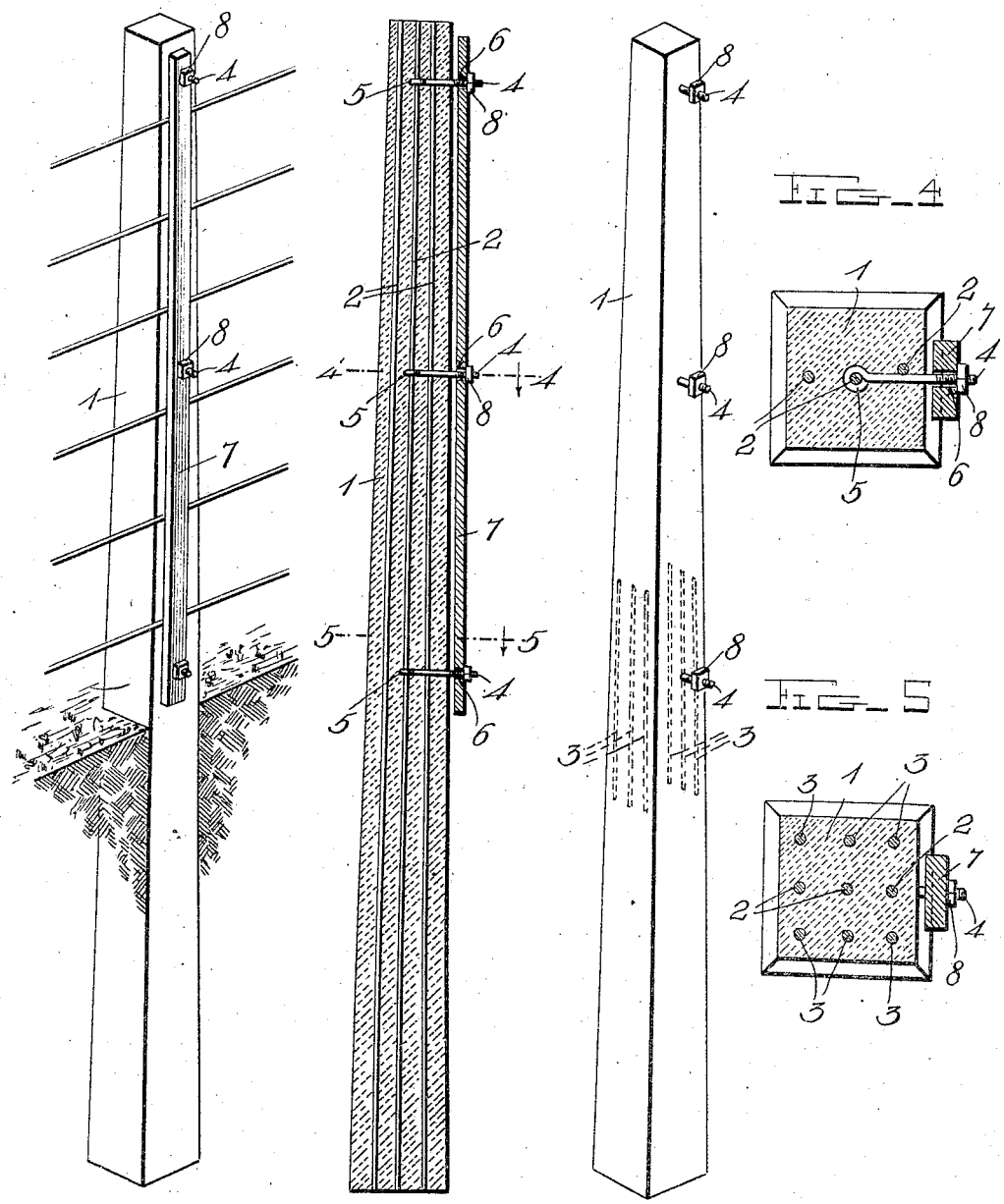

CHARLES A. MENDENHALL, OF FARMLAND, INDIANA, ASSIGNOR OF ONE-HALF TO E. J. MENDENHALL, OF FARMLAND, INDIANA.

FENCE-POST.

No. 888,719.　　　　Specification of Letters Patent.　　　Patented May 26, 1908.

Application filed August 30, 1907. Serial No. 390,693.

*To all whom it may concern:*

Be it known that I, CHARLES A. MENDENHALL, a citizen of the United States, residing at Farmland, in the county of Randolph and State of Indiana, have invented certain new and useful Improvements in Fence-Posts; and I do declare the following to be a full, clear, and exact description of the invention, such as will enable others skilled in the art to which it appertains to make and use the same.

This invention relates to improvements in fence posts.

The object of the invention is to provide a reinforce concrete fence post which shall be simple of construction, durable in use and comparatively inexpensive of production and which will be strengthened throughout its entire length and at the ground line additionally strengthened to withstand strain in all directions.

With these objects in view, the invention consists of certain novel features of construction, combination and arrangement of parts as will be more fully described hereinafter and particularly pointed out in the appended claims.

In the accompanying drawings, Figure 1 is a perspective view of a fence post constructed in accordance with the invention, and showing the manner in which the wires of a fence are secured thereto; Fig. 2 is a similar view of the fence post alone; Fig. 3 is a vertical sectional view of the post; Fig. 4 is a horizontal sectional view on the line 4—4 of Fig. 3; and Fig. 5 is a similar view on the line 5—5 of Fig. 3.

Referring more particularly to the drawings, 1 denotes the post, which may be of any suitable shape and length, the same being here shown and is preferably of rectangular form in cross section, and also preferably tapers from its lower toward its upper end. In the post is arranged a series of longitudinally disposed re-inforcing rods, or wires, 2, there being three of said wires shown in the present instance, one of the same being arranged in the center of the post, while the other two are arranged on each side of the central wire, adjacent to the front and rear sides of the post. In addition to the longitudinally disposed rods or wires which extend throughout the entire length of the post, I provide a plurality of short wires or rods, 3, which are embedded in the material of which the post is formed, at a point on a level with the ground line, thereby providing for an increased reinforcement of the post at this point, where the same is more apt to become broken off, and where the most strain is applied to the post.

In connection with the post I provide a suitable fence-securing device, which consists of a series of horizontally disposed laterally projecting bolts, 4, of which there are preferably three, one of which is arranged at the center of that portion of the post which projects above the ground, while the other two are arranged at suitable distances therefrom adjacent to the upper end of the post and to the ground line. The bolts, 4, have formed on their inner ends eyes, 5, through which the central re-inforcing rod, 2, is adapted to pass, thereby securely fastening the inner ends of the bolt. The outer ends of the bolts 4 project laterally a suitable distance from the front side thereof, and are adapted to enter and pass through holes, 6, formed in a fence-clamping bar, 7, which is arranged on and supported by the bolts adjacent to the front side of the post, and between which and the adjacent side of the post, are disposed the rails or line wires of the fence, said rails or wires being firmly clamped into engagement with the bolts by said bar by means of clamping nuts, 8, which are screwed onto the projecting threaded ends of the bolts, 4.

By providing the clamping bar, 7, and arranging the same as herein shown and described, any form of fence may be securely fastened to the post without the use of nails, staples, or other fastening devices.

The arrangement of the wood clamping bar 7 on the outside of the post obviates the necessity of forming a recess in the latter, which would tend to weaken the same, and the swelling or expanding of the strip would burst or break the post if set into a recess therein.

Having thus fully described our invention, what we claim as new and desire to secure by Letters-Patent, is:

1. A concrete post having a series of wires embedded therein and arranged in a row centrally of the post and extending from end to end thereof, and series of shorter wires embedded in said post and arranged in rows on opposite sides of the central row and extending above and below the ground line.

2. A concrete post having a series of wires embedded therein and arranged in a row centrally of the post and extending from end to end thereof, series of shorter wires embedded in said post and arranged in rows on opposite sides of the central row and extending above and below the ground line, and fence securing means carried by said post.

In testimony whereof I have hereunto set my hand in presence of two subscribing witnesses.

CHARLES A. MENDENHALL.

Witnesses:
ORA N. McCORMICK,
WILLIAM A. WOOD.